UNITED STATES PATENT OFFICE.

HERBERT J. KEITH, OF BROOKLINE, MASSACHUSETTS.

PRESERVATION OF EGGS.

1,137,761.  Specification of Letters Patent.  Patented May 4, 1915.

No Drawing.  Application filed June 23, 1914.  Serial No. 846,890.

*To all whom it may concern:*

Be it known that I, HERBERT J. KEITH, a citizen of the United States, and a resident of Brookline, in the county of Norfolk and State of Massachusetts, have invented certain new and useful Improvements in the Preservation of Eggs, of which the following is a specification.

This invention has relation to the preservation of eggs.

It has heretofore been proposed to preserve eggs by removing them from their shells and mixing them in a batter, employing either the whole egg or the separated whites and yolks respectively. It has been the practice in such case to make a batter to produce a uniform mixture and then to subject the mixture to a relatively low temperature for the purpose of freezing, and holding it at a temperature where the activity of micro-organisms ceases. This product, however, has not been wholly satisfactory for the reason that there is a tendency of the constituents of the matter being frozen to separate, according to the varying specific gravities of the constituents or component portions of the mixture. For instance, in egg mixtures there is a natural tendency of the yolk to accumulate in the upper portion of the mass and for the whites so-called to accumulate in the lower portion. The result of all this is that, when the mixture is finally frozen to a substantially solid condition, the mass is not uniform throughout the can or container. Furthermore care must be taken in following the old process to prevent too rapid freezing of the mixture, as otherwise it frequently happens that the cans or containers are burst by the swelling of the frozen mass from expansion due to freezing. On the other hand, where the temperature of the mass being treated is slowly reduced, there is a greater length of time permitted for the changes to take place, due to bacterial action and the oxidation of the fatty constituents.

For the purpose of overcoming the objections to the process which I have herein referred to, the present invention consists of a process in which the substance to be preserved is subjected to a constant stirring or churning action while being frozen and while atmospheric air is excluded therefrom so as to preserve the equality of the mixture. This may be accomplished by means of an ordinary freezing apparatus such as is used in the manufacture of ice cream so-called, except that the receptacle containing the egg must be sealed against the entrance of air thereto.

There are on the market at the present time various machines for this purpose, some of which are continuous in their operation, the cream or mixture being supplied and the frozen mass being fed away from the machine continuously. By thus agitating the product while it is being frozen, there is secured a uniform mixture or magma. Ordinarily, of course, when a batter or mixture of that sort is frozen by an ice cream freezer, there is added to and incorporated in the mixture or magma a large amount of air. The presence of the air does not ordinarily injure ice cream or other products which are to be used immediately, but, in the products which are to be preserved for any length of time, no additional air should be incorporated in the mixture or magma as it tends to bring about an oxidation of the fats with a consequent deterioration of the product. Furthermore the addition of the air greatly increases the bulk of the product and necessitates the use of larger containers than would otherwise be needed and greatly increases the cost of carrying on the business because of the increased storage charges and the increased cost of the cans or containers.

My invention, therefore, consists in the exclusion of the air from the product while it is being agitated and frozen. This is accomplished by filling the container of the freezing apparatus with egg and sealing it against the entrance of air. As a result, the expansion of the mixture or magma when frozen is limited to the expansion due to crystallization of some of the aqueous portions of the product. After the product has been thus frozen, it may be placed in cans or containers of relatively smaller size than would otherwise be employed, and may be kept for relatively long periods without danger of deterioration due to oxidation and without any material change in flavor.

Preferably the temperature of the product is brought during the freezing operation to approximately 25° to 27° F. After the product has been thus thoroughly agitated and partially frozen without adding air thereto, and has been placed in cans or containers, the latter are held in a refrigerator and are reduced to a temperature where bacterial action ceases, say zero F., at which temperature they are maintained until ready for use.

I have not deemed it necessary to show any apparatus for agitating and preliminarily freezing the product as many of the standard machines which are at the present time used for freezing ice cream may be utilized for this purpose, the only change necessary in such machines being to seal the compartment in which the product to be frozen is contained after being completely filled with the egg. These freezing machines are usually chilled by refrigerated brine or other refrigerated medium, and in practice this medium may be employed at a temperature of approximately zero degrees F. so as to secure as rapid freezing as possible.

A mixture or mass of egg batter, either whole or separated eggs, on being agitated and frozen as described, and then further frozen to a temperature of approximately zero degrees F., as herein described, is substantially solid and contains substantially no added air. As a result of the initial freezing, the magma is mushy and is not swollen more than is due to the crystallization of the water, differing in this respect from the ordinary ice cream, the bulk of which is increased by the air in the mixture.

I secure by my process a new product or article of manufacture, to wit, a frozen homogeneous compact mass of egg containing no added air. By the employment of the term "homogeneous" I mean a mass which is substantially of the same consistency, and in which the constituents or component parts are distributed substantially equally throughout the mass. This product is marketed in closed cans or containers and is kept frozen until ready for use.

I do not herein claim the agitation and freezing of the egg mixture in a vacuum, as that specifically is the invention claimed by Simeon C. Keith, Jr., in his Letters Patent No. 1,112,142, dated September 29, 1914.

What I claim is:

1. As a new product or article of manufacture, a churned homogeneous solid frozen egg mixture containing its original constituents but substantially no added air.

2. The herein described process which consists in excluding air from an egg mixture and simultaneously agitating and freezing such mixture.

3. The herein described process which consists in excluding air from an egg mixture, and in agitating or churning and simultaneously freezing such mixture while the air is excluded, and then freezing and holding such mixture at a temperature where bacterial action substantially ceases.

In testimony whereof I have affixed my signature, in presence of two witnesses.

HERBERT J. KEITH.

Witnesses:
  MARCUS B. MAY,
  E. BATCHELDER.